(12) United States Patent
Harless et al.

(10) Patent No.: US 7,797,146 B2
(45) Date of Patent: Sep. 14, 2010

(54) METHOD AND SYSTEM FOR SIMULATED INTERACTIVE CONVERSATION

(75) Inventors: William G. Harless, Bethesda, MD (US); Michael G. Harless, Rockville, MD (US); Marcia A. Zier, Bethesda, MD (US)

(73) Assignee: Interactive Drama, Inc., Bethesda, MD (US)

( * ) Notice: Subject to any disclaimer, the term of this patent is extended or adjusted under 35 U.S.C. 154(b) by 709 days.

(21) Appl. No.: 10/438,168

(22) Filed: May 13, 2003

(65) Prior Publication Data

US 2004/0230410 A1 Nov. 18, 2004

(51) Int. Cl.
| G06G 7/58 | (2006.01) |
| G06T 13/00 | (2006.01) |
| G09B 19/04 | (2006.01) |
| G09B 5/00 | (2006.01) |
| A63F 9/24 | (2006.01) |
| G10L 13/00 | (2006.01) |
| G10L 11/00 | (2006.01) |
| G06F 15/16 | (2006.01) |

(52) U.S. Cl. .................. 703/12; 434/185; 434/308; 434/323; 463/35; 345/202; 345/473; 345/474; 345/475; 704/260; 704/270; 704/275; 704/276; 709/246; 709/206; 709/250

(58) Field of Classification Search .................. 703/12; 345/202, 473, 474, 475, 727; 434/185, 308, 434/323; 463/35; 704/260, 270, 275, 276; 709/246, 206, 250

See application file for complete search history.

(56) References Cited

U.S. PATENT DOCUMENTS

| 4,468,204 | A | | 8/1984 | Scott et al. |
| 5,006,987 | A | * | 4/1991 | Harless ..................... 434/323 |
| 5,390,278 | A | | 2/1995 | Gupta et al. |
| 5,540,589 | A | | 7/1996 | Waters |
| 5,634,086 | A | * | 5/1997 | Rtischev et al. ............. 704/270 |
| 5,727,950 | A | | 3/1998 | Cook et al. |
| 5,730,603 | A | * | 3/1998 | Harless ..................... 434/308 |
| 5,772,446 | A | | 6/1998 | Rosen |
| 5,827,071 | A | | 10/1998 | Sorensen et al. |
| 5,836,771 | A | | 11/1998 | Ho et al. |
| 5,870,755 | A | * | 2/1999 | Stevens et al. ............. 707/104.1 |

(Continued)

OTHER PUBLICATIONS

Michael McTear: "Spoken Dialogue Technology: Enabling the Conversational User Interface", ACM Press, Mar. 2002. ACM Computing Surveys, vol. 34: pp. 90-169.*

(Continued)

*Primary Examiner*—Kamini S Shah
*Assistant Examiner*—Shambhavi Patel
(74) *Attorney, Agent, or Firm*—Finnegan, Henderson Farabow, Garrett & Dunner, L.L.P.

(57) ABSTRACT

A method of simulating interactive communication between a user and a human subject. The method comprises: assigning at least one phrase to a stored content sequence, wherein the content sequence comprises a content clip of the subject; parsing the at least one phrase to produce at least one phonetic clone; associating the at least one phonetic clone with the stored content sequence; receiving an utterance from the user; matching the utterance to the at least one phonetic clone; and displaying the stored content sequence associated with the at least one phonetic clone.

33 Claims, 12 Drawing Sheets

U.S. PATENT DOCUMENTS

| | | | |
|---|---|---|---|
| 5,990,901 | A | 11/1999 | Lawton et al. |
| 6,097,381 | A * | 8/2000 | Scott et al. ............... 715/203 |
| 6,188,984 | B1 | 2/2001 | Manwaring et al. |
| 6,234,802 | B1 | 5/2001 | Pella et al. |
| 6,246,981 | B1 * | 6/2001 | Papineni et al. ............ 704/235 |
| 6,461,166 | B1 | 10/2002 | Berman |
| 6,498,921 | B1 | 12/2002 | Ho et al. |
| 6,539,354 | B1 * | 3/2003 | Sutton et al. ............... 704/260 |
| 6,585,519 | B1 | 7/2003 | Jenkins et al. |
| 6,606,479 | B2 | 8/2003 | Cook et al. |
| 6,662,161 | B1 | 12/2003 | Cosatto et al. |
| 6,726,486 | B2 | 4/2004 | Budra et al. |
| 6,731,307 | B1 * | 5/2004 | Strubbe et al. ............. 715/727 |
| 6,919,892 | B1 | 7/2005 | Cheiky et al. |
| 6,944,586 | B1 * | 9/2005 | Harless et al. .............. 703/23 |
| 7,019,749 | B2 * | 3/2006 | Guo et al. .................. 345/473 |
| 7,076,430 | B1 * | 7/2006 | Cosatto et al. ............. 704/275 |
| 7,136,818 | B1 * | 11/2006 | Cosatto et al. ............. 704/275 |
| 7,168,953 | B1 * | 1/2007 | Poggio et al. .............. 434/185 |
| 7,391,421 | B2 * | 6/2008 | Guo et al. .................. 345/473 |
| 7,499,861 | B2 * | 3/2009 | Danieli et al. ............. 704/275 |
| 7,546,382 | B2 * | 6/2009 | Healey et al. .............. 709/246 |
| 7,610,556 | B2 * | 10/2009 | Guo et al. .................. 715/745 |
| 7,627,478 | B2 * | 12/2009 | Cosatto et al. ............. 704/275 |
| 2002/0008703 | A1 * | 1/2002 | Merrill et al. .............. 345/473 |
| 2002/0031754 | A1 | 3/2002 | Spector |
| 2003/0028498 | A1 | 2/2003 | Hayes-Roth |
| 2003/0125945 | A1 | 7/2003 | Doyle |
| 2003/0137537 | A1 | 7/2003 | Guo et al. |
| 2003/0144055 | A1 * | 7/2003 | Guo et al. .................... 463/35 |
| 2003/0163311 | A1 * | 8/2003 | Gong .......................... 704/250 |
| 2003/0163315 | A1 * | 8/2003 | Challapali et al. ........... 704/260 |
| 2003/0167167 | A1 * | 9/2003 | Gong .......................... 704/250 |
| 2003/0187660 | A1 * | 10/2003 | Gong .......................... 704/277 |
| 2003/0229494 | A1 | 12/2003 | Rutten et al. |
| 2004/0018478 | A1 | 1/2004 | Styles |
| 2004/0044516 | A1 | 3/2004 | Kennewick et al. |
| 2004/0111269 | A1 * | 6/2004 | Koch .......................... 704/275 |
| 2004/0117352 | A1 | 6/2004 | Schabes et al. |
| 2006/0074688 | A1 * | 4/2006 | Cosatto et al. ............. 704/275 |
| 2008/0165388 | A1 * | 7/2008 | Serlet ......................... 358/448 |

OTHER PUBLICATIONS

Mosur Ravishankar: "Efficient Algorithms for Speech Recognition". 1996. pp. 1-131.*
Justin Cassell: "Embodied Conversataional Interface Agents". ACM Press, Apr. 2003. vol. 43, pp. 70-78.*
H. Vilhjalmsson: "Fully Embodied Conversational Avatars: Making Communicative Behaviors Autonomous". Kluwer Academic Publishers, 1999. Autonomous Agents and Multi-Agent Systems, pp. 2, 45-64.*
Jelle de Haan: "Marvin: A prototype Speech Controlled Web Agent". http://www.kbs.twi.tudelft.nl/People/Students/J.K.deHaan/.*
Justin Cassell. "Embodied Conversataional Interface Agents". ACM Press, Apr. 2003. vol. 43, pp. 70-78.*
Wester, Mirjam. 'Pronunciation Variation Modeling for Dutch Automatic Speech Recognition', 2002.*
Seneff et al. 'Angie: A New Framework for Speech Analysis Based on Morpho-Phonolgical Modeling'. Proc. ICSLC 1996.*
Agah et al. 'Intelligent Graphical User Interface Design Utilizing Multiple Fuzzy Agents'. 2000.*
Bonnafous et al. "Co-Operative and Concurrent Blending Motion Generators" 2000.*
Thalmann et al. "Face to Virtual Face", IEEE 1998.*
Perng et al. "Image Talk: A Real Time Synthetic Talking Head Using One Single Image with Chinese Text-To-Speech Capability".*
Cowie, et al. "Emotion Recognition in Human Computer Interaction" IEEE Signal Processing Magazine, 2001.*
Bregler et al. "Video Rewrite: Driving Visual Speech with Audio" Interval Research Corporation, 1997.*
McTear, Michael. "Spoken Dialogue Technology: Enabling the Conversational User Interface", ACM Computing Surveys, vol. 34, No. 1, Mar. 2002.*
Thalmann, Daniel. "The Virtual Human as a Multimodal Interface" ACM 2000.*
Lieberman, Henry. "Autonomous Interface Agents" ACM 1997.*
Shen, et al. "Agent-aided Collaborative Virtual Environments over HLA/RTI", 2001.*
Lee, et al. "An Overview of the SPHINX Speech Recognition System", IEEE Transactions on Acoustics Speech. and Signal Processing, vol. 38. No. I . Jan. 1990.*
Rosenfeld, et al. "Towards a Universal Speech Interface", Carnegie Mellon University.*
Nijholt, et al. "Multimodal Interactions with Agents in Virtual Worlds", 2001.*
Home Voice. Smart Home [retrieved Feb. 12, 1998]. Retrieved from the Internet: <URL:http://web.archive.org/web/19981202215658/http://smarthome/1470.html>.
United States PTO Office Action dated Oct. 16, 2007, for U.S. Appl. No. 11/102,951.
United States PTO Office Action dated Mar. 6, 2007, for U.S. Appl. No. 11/102,951.
United States PTO Office Action dated Apr. 19, 2006, for U.S. Appl. No. 11/102,951.
United States PTO Office Action, dated Aug. 7, 2008, for U.S. Appl. No. 11/103,079.
United States PTO Office Action, dated Jan. 23, 2008, for U.S. Appl. No. 11/103,079.
United States PTO Office Action, dated Jan. 24, 2008, for U.S. Appl. No. 11/102,951.
United States PTO Office Action, dated Apr. 23, 2008, for U.S. Appl. No. 11/103,079.
USPTO Office Action, dated Dec. 22, 2009, for U.S. Appl. No. 11/103,079.
USPTO Office Action, dated Feb. 23, 2009, for U.S. Appl. No. 11/103,079.
USPTO Office Action, dated Nov. 24, 2009, for U.S. Appl. No. 11/102,951.
USPTO Office Action, dated Feb. 20, 2009, for U.S. Appl. No. 11/102,951.

* cited by examiner

_US 7,797,146 B2_

METHOD AND SYSTEM FOR SIMULATED INTERACTIVE CONVERSATION

TECHNICAL FIELD

The invention relates to the field of interactive video, and more specifically, a system for and method of simulating an interactive conversation.

BACKGROUND

Interactive conversation systems (ICS) are becoming more important as tools to educate, entertain, and inform. For example, medical school students may practice their diagnosing skills utilizing ICS without the need to interact with real patients. School children may have one-on-one conversations with leading historical and modern figures, such as Senator John Glenn, providing an opportunity that would not otherwise exist.

However for such educational and informative systems to be of real value, the system should impart believability. A user should believe that she is interacting with an actual person, so that the computer display screen falls away and the user arrives at a state of suspension of disbelief. Of course, systems using computer-generated characters, such as "avatars" as the subject, are generally unable to generate this suspension of disbelief. Even prior art systems utilizing video of human subjects often fall short in maintaining that suspension of disbelief by failing to promptly respond to questions or statements by the user. Lags in computational time, retrieval of images from storage, and poor programming algorithms may cause a hesitation between when a question is asked and when it is answered. ICS that utilize generic off-the-shelf speech recognition engines without additional enhancement often fall prey to this problem. Thus, the effect resembles talking to a computer character on the other side of the planet, instead of a real person right in front of the user, destroying the believability of the system.

In addition, ICS are often programmed to provide a video clip in response to a question from the user. However, these video clips may not segue into each other in a smooth fashion. They may cause an initial jerk in the character's position from a previous position; or, and perhaps worse, they may leave a character at the end of a video clip in an awkward position, e.g., with their head at an uncomfortable tilt or their mouth open. This "jump cut" or "rough cut" position also may destroy the believability of the system. Prior art systems may attempt to eliminate the jump cut by morphing the character's image between video clips. Morphing transforms a first character image to a second character image by generating a series of frames containing computer-generated character images that attempt to mimic the appearance of an actual transition. Unfortunately, morphing produces an unnatural, animated result that destroys the user's suspension of disbelief.

The present invention addresses the above problems and is directed to achieving at least one of the above stated goals.

SUMMARY OF THE INVENTION

In accordance with an aspect consistent with the present invention, a method is provided of simulating interactive communication between a user and a human subject. The method comprises: assigning at least one phrase to a stored content sequence, wherein the content sequence comprises a content clip of the subject; parsing the at least one phrase to produce at least one phonetic clone; associating the at least one phonetic clone with the stored content sequence; receiving an utterance from the user; matching the utterance to the at least one phonetic clone; and displaying the stored content sequence associated with the at least one phonetic clone.

In accordance with another aspect consistent with the present invention, a system is provided for simulating interactive communication between a user and a human subject. The system comprises: a display for displaying the subject; a memory; and a processor, coupled to the memory and the display. The processor is operable to: assign at least one phrase to a stored content sequence of the subject, wherein the content sequence comprises a content clip of the subject; parse the at least one phrase to produce at least one phonetic clone of the at least one phrase; associate the at least one phonetic clone with the stored content sequence; receive an utterance from the user; match the utterance to the at least one phonetic clone; and display the stored content sequence associated with the at least one phonetic clone.

In accordance with another aspect consistent with the present invention, a method is provided of simulating interactive communication between a user and a human subject. The method comprises: storing a content clip of the subject; frame matching the content clip of the subject to a neutral image of the subject to select a begin clip; matching an utterance of the user to the video clip; and displaying the begin clip to the user followed by displaying the content clip to the user.

In accordance with another aspect of the present invention, a method is provided of simulating interactive communication between a user and a human subject. The method comprises: receiving a voice input from the user; matching the voice input to one of a plurality of a stored phonetic clones, the phonetic clones each corresponding to a target speech phrase associated with a stored content sequence file depicting the subject, the number of stored phonetic clones being greater than the number of stored content sequence files; and displaying the stored content sequence file matched to the phonetic clone.

In accordance with another aspect consistent with the present invention, a conversation system is provided for simulating interactive communication between a user and a human subject. The conversation system comprises: a display for displaying the subject; a memory; and a processor, coupled to the memory and the display. The processor is operable to: receive a voice input from the user; match the voice input to one of a plurality of a stored phonetic clones, a first portion of the phonetic clones each corresponding to a target speech phrase associated with a stored content sequence file depicting the first subject and a second portion of the phonetic clones each corresponding to a target speech phrase associated with a stored content sequence file depicting the second subject, the number of stored phonetic clones being greater than the number of stored content sequence files; and display the stored content sequence file matched to the phonetic clone.

In accordance with another aspect of the present invention, a method is provided of authoring interactive communication between a user and a human subject. The method comprises: assigning a target speech phrase to a stored content sequence file of the subject; parsing the target speech phrase to produce a plurality of stored phonetic clones, the phonetic clones corresponding to the target speech phrase, the number of stored phonetic clones being greater than the number of stored content sequence files; and associating the phonetic clones with the stored content sequence file.

The foregoing summarizes only a few aspects of the invention and is not intended to be reflective of the full scope of the invention as claimed.

Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a system consistent with the invention and, together with the description, serve to explain the principles of the invention.

DETAILED DESCRIPTION

Reference will now be made in detail to the present exemplary embodiments consistent with the invention, examples of which are illustrated in the accompanying drawings. Wherever possible, the same reference numbers will be used throughout the drawings to refer to the same or like parts.

Figure 1:
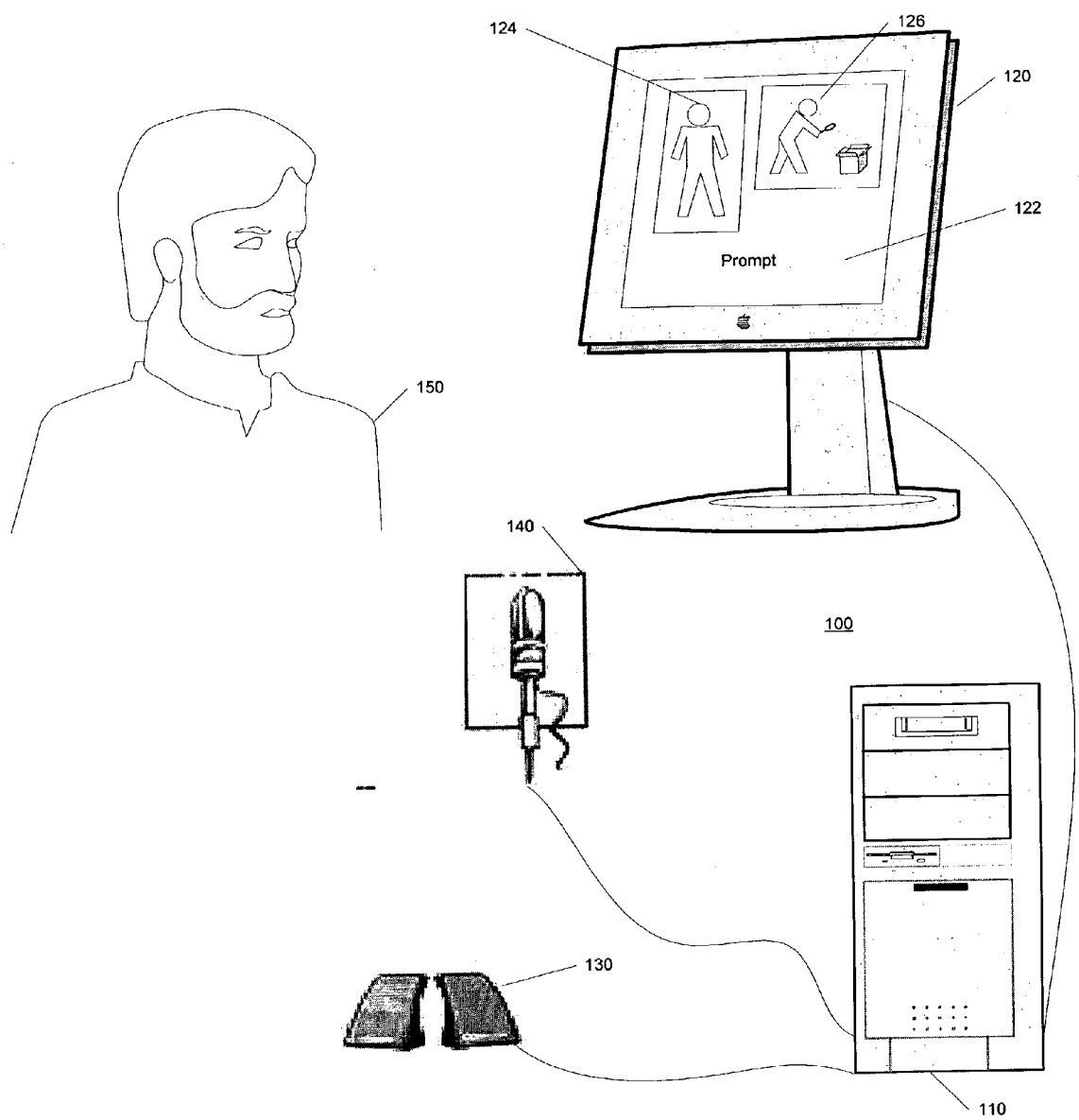
FIG. 1 is an illustration of a system consistent with the present invention in its operating environment.

FIG. 1 is an illustration of a system consistent with the present invention in its operating environment. As shown in FIG. 1, a user 150 may interact with a system 100 to conduct a simulated natural conversation with a video display of a human subject. System 100 may comprise a conversation platform 110, a microphone 140 connected to conversation platform 110, one or more speakers 130 connected to conversation platform 110, and a display 120 connected to conversation platform 110. User 150, speaking through microphone 140 and listening through speakers 130 may engage in simulated conversation with the subject in character window 124 in a natural, conversational tone without any requirement to "train" the system 100 in the speech patterns of user 150.

User 150 may be provided with one or more prompts 122 that provide a list of recommended questions for user 150 to speak into microphone 140. As user 150 speaks one of the prompted questions into microphone 140, conversation platform 110 may receive this utterance as audio signals from microphone 140, parse the audio signals, compare the parsed audio signals to a conversation database of phonemes to find a matching phrase, and play a video content sequence of the subject responding to the question in character window 124. Consistent with the present invention, the content sequence may include a "begin clip" and/or an "end clip" surrounding a video "content clip". A content clip is an audio/video recording of a speaking human being. Begin clips and end clips are video recordings of a human being moving from a non-neutral position within the character window to a neutral position, or vice-versa. Begin clips and end clips serve to transition the video content clip from or to, respectively, a neutral waiting state of the subject in character window 124. This may serve to reduce or eliminate abrupt or jerky transitions between content clips that may distract from the believability of the conversation. The use of transitioning begin clips and end clips reduces the unnatural look associated with prior art morphing techniques.

One or more prompted questions, optionally organized by subject area, may be displayed in prompt field 122 on display 120. User 150 may select one of the prompted questions or request a different subject area. User 150 may also select from one or more multimedia objects to display in multimedia window 126. Multimedia objects may include, for example, audio/video or still images related to the subject but not part of the simulated conversation.

In addition, system 100 may provide a plurality of character windows 124 each having a subject so that user 150 may interact with a panel of subjects. When user 150 speaks a prompted question, conversation platform 110 may select which subject will respond, based on a weighting system, or one or more characters may respond in turn.

Consistent with the present invention, one or more authoring processes may also be provided to permit authoring of interactive conversations to be engaged in by user 150. The authoring processes may include a video editing process for generating content sequences including selecting content clips, begin clips, and end clips; a process to assign questions or statements (collectively, "phrases") to the content sequences; and a phoneme generation process to generate phonetic "clones" of phrases for storage in a conversation database to generate interactive conversation scripts, in a manner to be described below.

Figure 2:
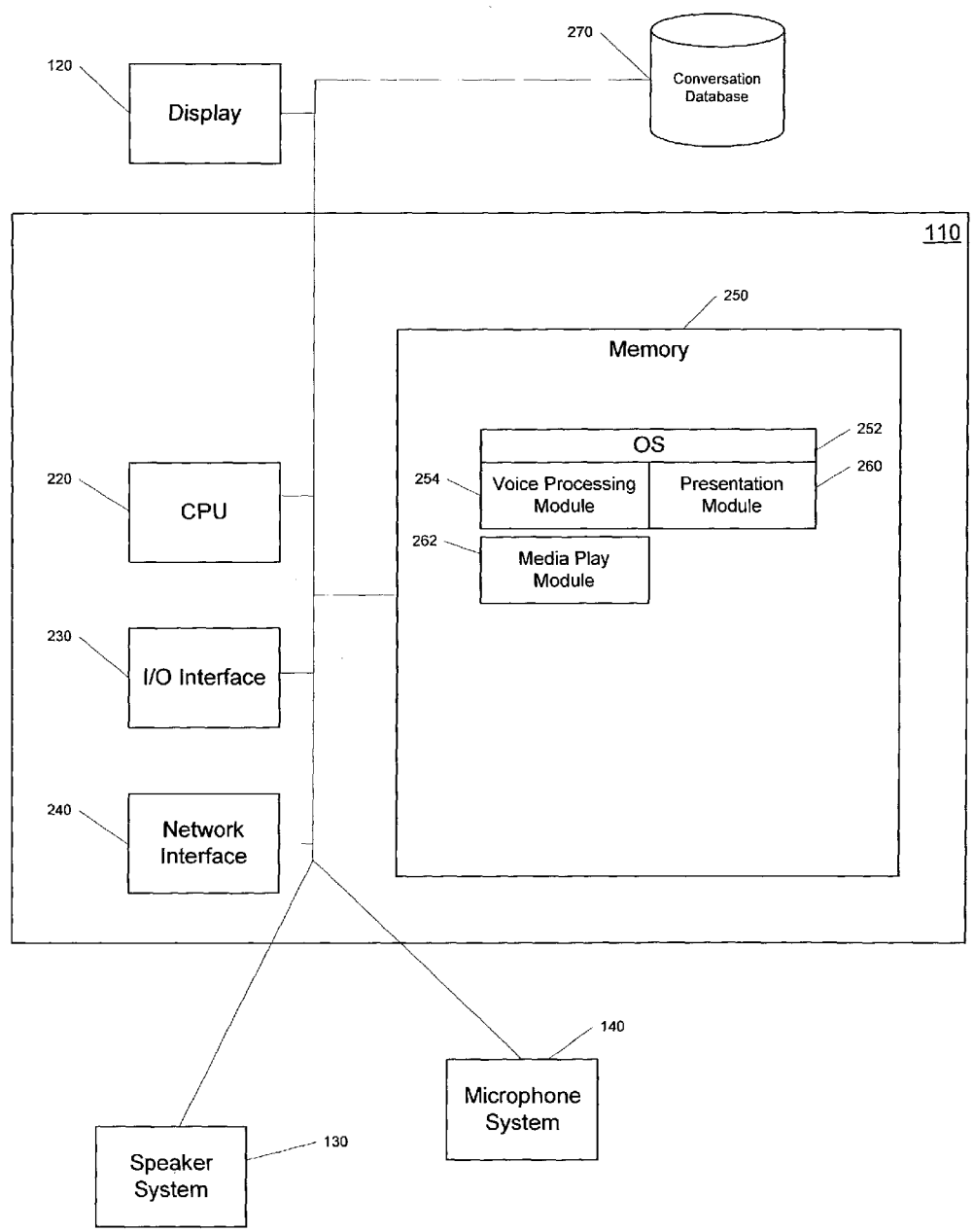
FIG. 2 is a block diagram of a conversation platform 110 consistent with the present invention.

FIG. 2 is a block diagram of a conversation platform 110 consistent with the present invention. As illustrated in FIG. 2, a system environment of conversation platform 110 may include a central processing unit 220, an input/output interface 230, a network interface 240, and memory 250 coupled together by a bus. Conversation platform 110 may be adapted to include the functionality and computing capabilities to utilize interactive conversation scripts in interacting with a user. Conversation platform 110 may be coupled to display 120.

As shown in FIGS. 1 and 2, conversation platform 110 may comprise a PC or mainframe computer for performing various functions and operations consistent with the invention. Conversation platform 110 may be implemented, for example, by a general purpose computer selectively activated or reconfigured by a computer program stored in the computer, or may be a specially constructed computing platform for carrying-out the features and operations of the present invention. Conversation platform 110 may also be implemented or provided with a wide variety of components or subsystems including, for example, at least one of the following: at least one central processing units 220, a co-processor, memory 250, registers, and other data processing devices and subsystems.

Conversation platform 110 may also communicate or transfer conversation scripts via I/O interface 230 and/or network interface 240 through the use of direct connections or communication links to other elements of the present invention. For example, a firewall in network interface 240, prevents access to the platform by unauthorized outside sources.

Alternatively, communication within conversation platform 110 may be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, conversation platform 110 may be located in the same location or at a geographically distant location from systems 120, 130, 140, and 270.

I/O interface 230 of the system environment shown in FIG. 2 may be implemented with a wide variety of devices to receive and/or provide the data to and from conversation platform 110. I/O interface 230 may include an input device, a storage device, and/or a network. The input device may include a keyboard, a microphone, a mouse, a disk drive, video camera, magnetic card reader, or any other suitable input device for providing data to conversation platform 110.

Network interface 240 may be connected to a network, such as a Wide Area Network, a Local Area Network, or the Internet for providing read/write access to interactive conversation scripts and data in conversation database 270.

Memory 250 may be implemented with various forms of memory or storage devices, such as read-only memory (ROM) devices and random access memory (RAM) devices. Memory 250 may also include a memory tape or disk drive for reading and providing records on a storage tape or disk as input to conversation platform 110. Memory 250 may comprise computer instructions forming: an operating system 252; a voice processing module 254 for receiving voice input from a user and for comparing the voice input to a library of phoneme-based phrases to provide one or more matching phrases; a presentation module 260 for running interactive conversation scripts (to be described in detail below); and a media play module 262 for providing multimedia object to a user.

A conversation database 270 is coupled to conversation platform 110. Interactive conversation scripts, phoneme databases, and clips may be stored on conversation database 270. Conversation database 270 may be electronic memory, magnetic memory, optical memory, or a combination thereof, for example, SDRAM, DDRAM, RAMBUS RAM, ROM, Flash memory, hard drives, floppy drives, optical storage drives, or tape drives. Conversation database 270 may comprise a single device, multiple devices, or multiple devices of multiple device types, for example, a combination of ROM and a hard drive.

While the term "script" is used in conjunction with the system, the script is less a written series of directions and more a table of content sequences linked to phrases, such that when a phrase is uttered by the user a content sequence corresponding to the phrase is played for the user. Content sequences are stored in the conversation database 270 linked to one or more phrases in the phoneme database. Each content sequence may be associated with one or more attributes, including, for example: quality, resources, and order. The quality attribute, as previously described, is a measure of the quality of the subject's response as determined by the author of the script. The resources attribute may be a listing of one or more resources for use in conjunction with the content sequence. For example, resources may be text files, HTML files, or multimedia files or links. The order attribute may be an instruction for the order in which the associated phrase is utilized in providing prompts to the user.

Figure 3:
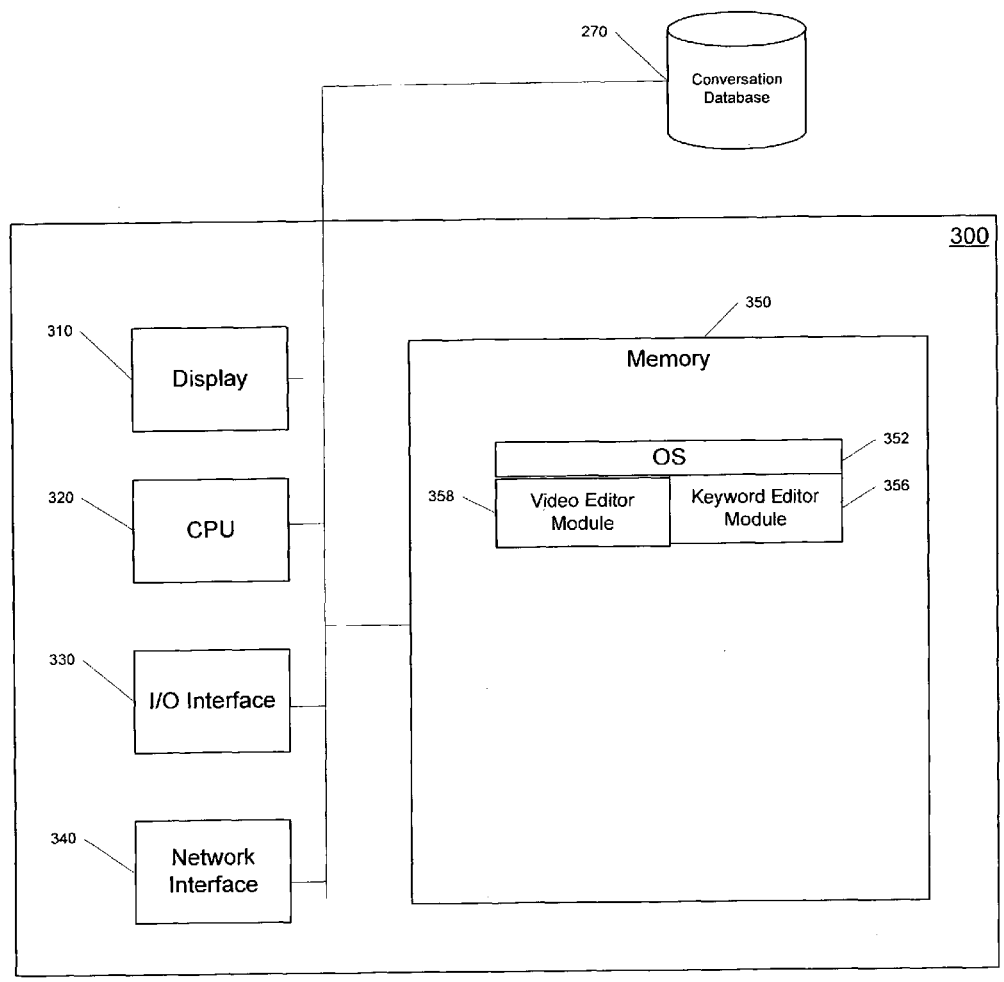
FIG. 3 is a block diagram of an authoring platform 300 consistent with the present invention.

FIG. 3 is a block diagram of an authoring platform 300 consistent with the present invention. As illustrated in FIG. 3, a system environment of authoring platform 300 may include a display 310, a central processing unit 320, an input/output interface 330, a network interface 340, and memory 350 coupled together by a bus. Authoring platform 300 may also be implemented on the same computer as conversation platform 110. Authoring platform 300 maybe adapted to include the functionality and computing capabilities to develop interactive conversation scripts used by a conversation platform to interact with a user.

As shown in FIG. 3, authoring platform 300 may comprise a PC or mainframe computer for performing various functions and operations consistent with the invention. Authoring platform 300 may be implemented, for example, by a general purpose computer selectively activated or reconfigured by a computer program stored in the computer, or may be a specially constructed computing platform for carrying-out the features and operations of the present invention. Authoring platform 300 may also be implemented or provided with a wide variety of components or subsystems including, for example, at least one of the following: at least one central processing units 320, a co-processor, memory 350, registers, and other data processing devices and subsystems.

Authoring platform 300 may also communicate or transfer conversation scripts via I/O interface 330 and/or network interface 340 through the use of direct connections or communication links to other elements of the present invention. For example, a firewall in network interface 340, prevents access to the platform by unauthorized outside sources.

Alternatively, communication within authoring platform 300 may be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, authoring platform 300 may be located in the same location or at a geographically distant location from conversation database 270.

I/O interface 330 of the system environment shown in FIG. 3 may be implemented with a wide variety of devices to receive and/or provide the data to and from authoring platform 300. I/O interface 330 may include an input device, a storage device, and/or a network. The input device may include a keyboard, a microphone, a mouse, a disk drive, video camera, magnetic card reader, or any other suitable input device for providing data to authoring platform 300.

Network interface 340 may be connected to a network, such as a Wide Area Network, a Local Area Network, or the Internet for providing read/write access to interactive conversation scripts and data in conversation database 270.

Memory 350 may be implemented with various forms of memory or storage devices, such as read-only memory (ROM) devices and random access memory (RAM) devices. Memory 350 may also include a memory tape or disk drive for reading and providing records on a storage tape or disk as input to authoring platform 300. Memory 350 may comprise computer instructions forming: an operating system 252; a keyword editor module 356 for processing phrases into the library of phonemes; and a video editor module 358 for editing video clips, begin clips, and end clips.

Conversation database 270 is coupled to authoring platform 300. Interactive conversation scripts as described previously, phoneme databases, and clips may be stored on conversation database 270. Conversation database 270 may be electronic memory, magnetic memory, optical memory, or a combination thereof, for example, SDRAM, DDRAM, RAMBUS RAM, ROM, Flash memory, hard drives, floppy drives, optical storage drives, or tape drives. Conversation database 270 may comprise a single device, multiple devices, or multiple devices of multiple device types, for example, a combination of ROM and a hard drive.

Figure 4A:
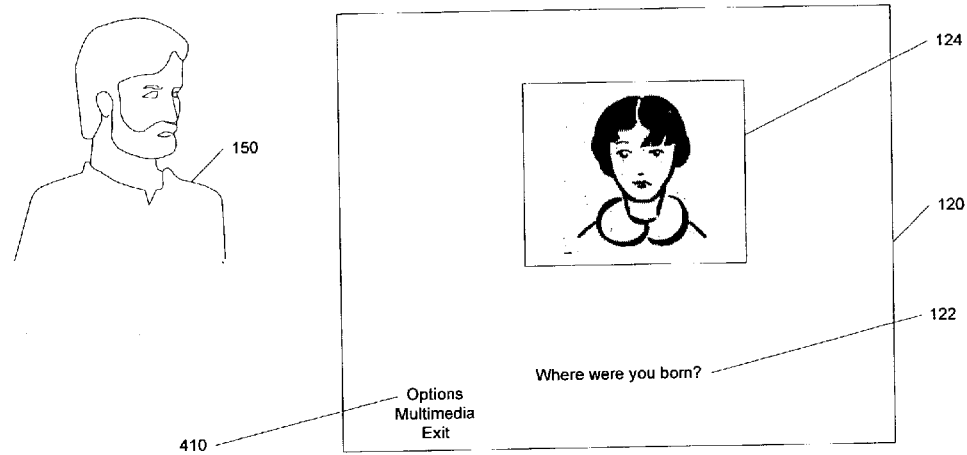
FIG. 4a is an illustration of a display screen at a prompting state consistent with the present invention.

FIG. 4a is an illustration of a display screen at a prompting state consistent with the present invention. User 150 may initially be presented with a display 120 having a human subject in a character window 124 in a prompting state, i.e., the subject is in a neutral state awaiting a question or statement, ("phrase") from user 150. The subject may be displayed as a still picture, or the subject may be displayed through a video clip of the subject in a generally motionless "listening" state. User 150 may also be presented with one or more prompts 122 that may be related to a particular subject area. Prompts 122 may be shown on display 120 simultaneously, for example, as a list, or may be consecutively flashed on display 120. Prompts 122 assist user 150 in speaking a phrase that is known to an interactive conversation script being executed on system 100. Display 120 may also include one or more option areas 410 that display additional phrases, not related to a simulated conversation, that may be selected and spoken by user 150.

Figure 4B:
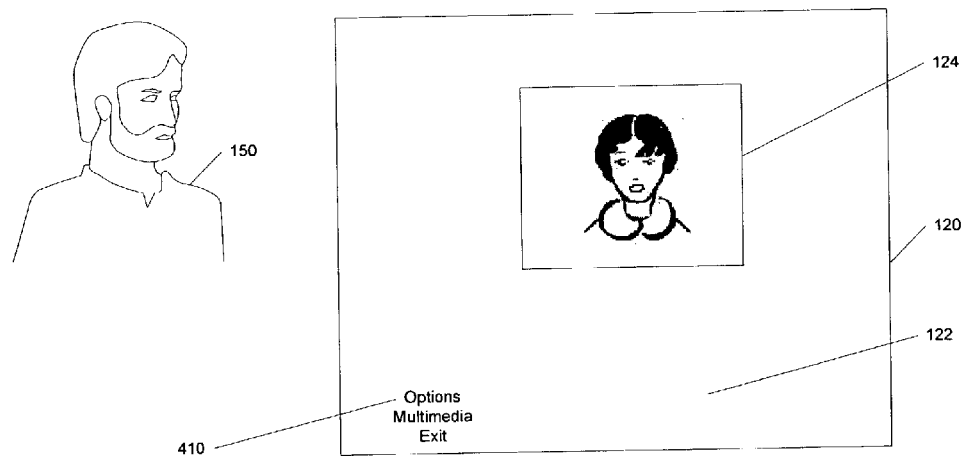
FIG. 4b is an illustration of a display screen during a speech state consistent with the present invention.

FIG. 4b is an illustration of a display screen during a speech state consistent with the present invention. After user 150 speaks a phrase, for example, "Where were you born?," into the microphone, the interactive system 100 may: parse audio signals representing the phrase into phonemes; match the phonemes to a database of phonemes corresponding to a phrase; and, based on the matched phrase, provide a content sequence of the human subject in character window 124 responding to the matched phrase. The content sequence may have a begin clip preceding a content clip to transition the subject from the prompting state to the speech state, so that rough cuts are generally avoided. At any time during the speech state, user 150 may utter a halt command, such as "Stop," which returns the subject to the prompting state.

Figure 4C:
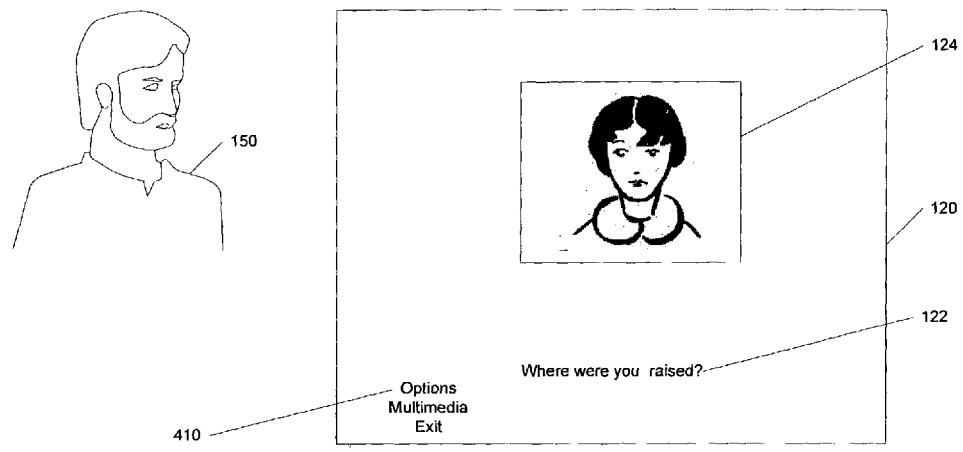
FIG. 4c is an illustration of a display screen at a prompting state consistent with the present invention.

FIG. 4c is an illustration of a display screen at a prompting state consistent with the present invention. When the content sequence is complete, the interactive system 100 returns to the prompting state to await further questions. The content sequence may include, following the content clip, an end clip to ease the transition from the video in the content clip to the prompting state, reducing rough cuts that may take user 150 out of his state of disbelief. The system 100 may also return to the prompting state following the issuance of a halt command by user 150.

Figure 4D:
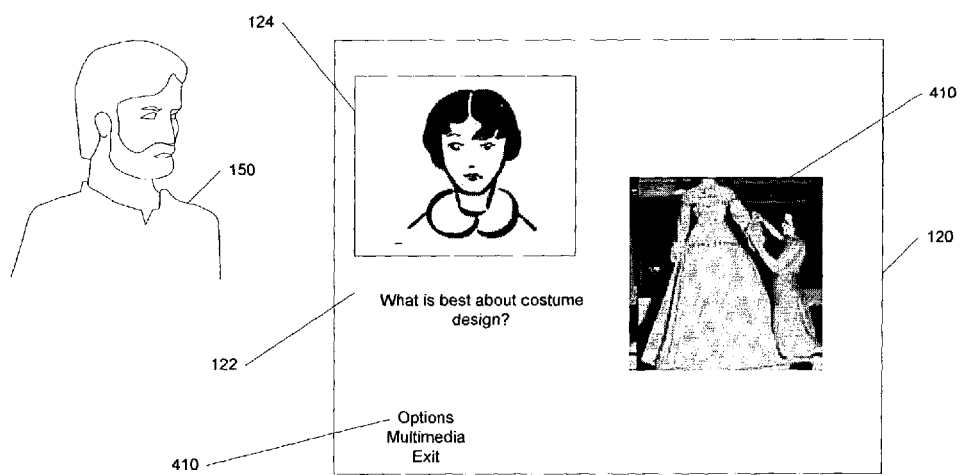
FIG. 4d is an illustration of a display screen at a multimedia exhibition state consistent with the present invention.

FIG. 4d is an illustration of a display screen at a multimedia exhibition state consistent with the present invention. Consistent with the present invention, one of the options that may be available to user 150 is to request a multimedia object from the system 100. For example, user 150 may wish to see examples of the subject at work. If user 150 makes such a request at the prompting state, a multimedia window 410 may be added to the display screen along with character window 123 or multimedia window 410 may replace character window 124. During the multimedia state, the system 100 may also be active in the prompting state to continue the conversation as the multimedia object is displayed.

In addition, the system may enter the multimedia state from the speech state. For example, if the author of the system designates a multimedia link to the video clip, when a video clip is played in response to an utterance of user 150 a multimedia object may automatically be displayed in multimedia window 410.

Following display of the multimedia object in multimedia window 410, the system 100 may return to the prompting state. In addition, a halt command by user 150 may return the system 100 to the prompting state at any point in time.

Figure 4E:
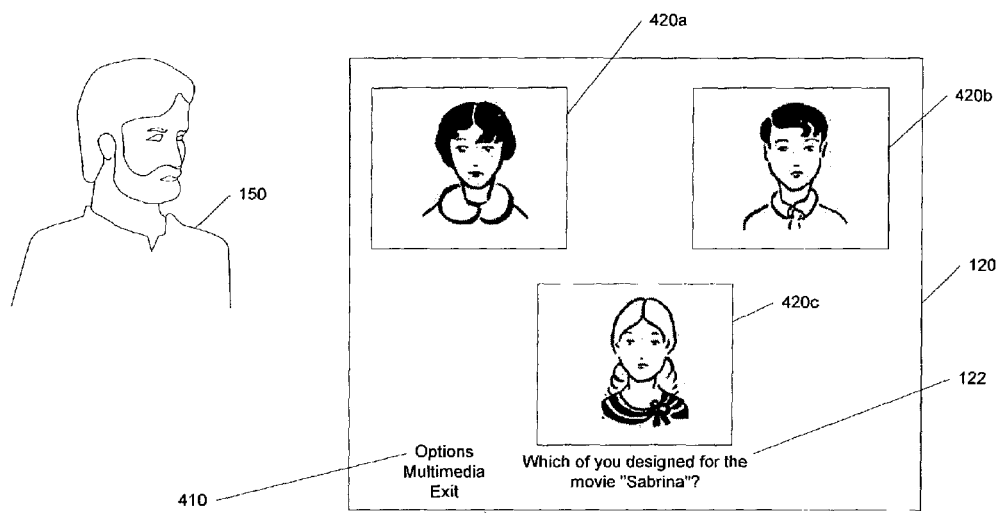
FIG. 4e is an illustration of a display screen at a prompting state in a multi-character conversation consistent with the present invention.

FIG. 4e is an illustration of a display screen at a prompting state in a multi-subject conversation consistent with the present invention. In addition to facilitating an interactive conversation with a single subject in a single character window, multiple subjects in respective multiple character windows 420a, 420b, and 420c may be provided. This mode of operation may function similar to the single character window operation previously described, with the following differences. The system 100 may choose which subject responds to the phrase based on a quality attribute of the matched content sequence. The quality attribute is a measure of the quality of the subject's response as determined by the author of the script. For example, a highly provocative or informative response may be given a higher quality score than a response which is bland or uninformative.

The subject with the highest quality attribute of a matched content sequence may respond to the phrase uttered by user 150. Once the response is provided, in the event the question is asked again by the user, the subject with the next highest quality attribute of a matched content sequence may respond. Alternatively, at the discretion of the author, one or more subjects may respond sequentially in the order of their quality attributes, with, for example, the subject with the highest quality attribute of a matched content sequence speaking first with one or more of the other subjects following. Those skilled in the art will appreciate the variations that may occur. Thus, the system 100 facilitates the opportunity for a panel-like discussion between user 150 and multiple subjects.

Figure 4F:
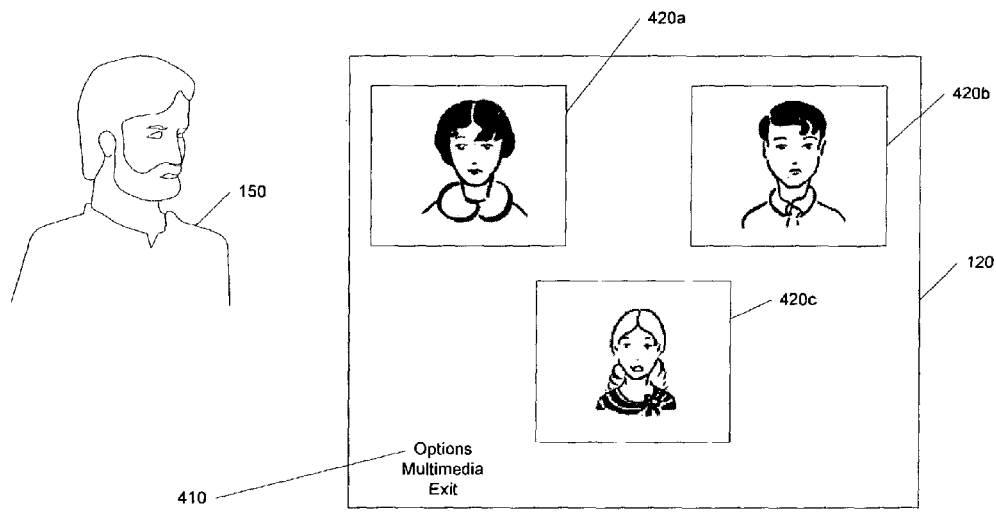
FIG. 4f is an illustration of a display screen at a speech state in a multi-character conversation consistent with the present invention.

FIG. 4f is an illustration of a display screen at a speech state in a multi-subject conversation consistent with the present invention. As seen in this figure, the subject in character window 420c is responding to user 150. Once again, consistent with the invention, when a content sequence is completed the system 100 may return to the prompting state.

In any of the above system 100, the system may remove the prompts 122 or option menu 410 from display 120 during the speech state, so as to enhance the impression of being in an actual conversation.

Figure 5:
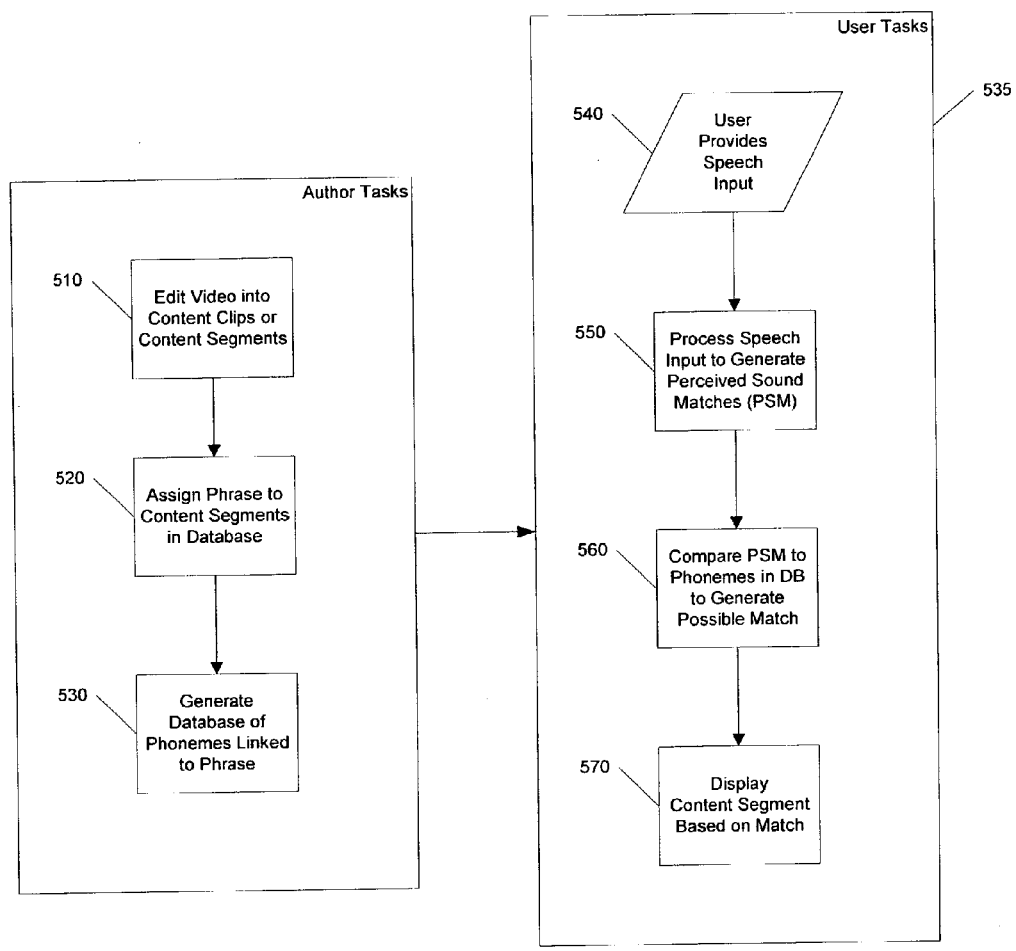
FIG. 5 is a flowchart of an author process and a user interaction process consistent with the present invention.

FIG. 5 is a flowchart of an author process and a user interaction process consistent with the present invention. The author process may comprise stages 510, 520 and 530, which may be executed in any order. The author processes may be executed on authoring platform 300. At stage 510, the author may edit signals from one or more video sources into video clips. Video clips may be generated from a video source, such as a video camera recording of a human subject, and saved as individual video files, or video clips may comprise a designated start frame and a designated end frame within a video file to form video clips including content clips, begin clips, and end clips. The author may designate the start frame and the end frame, whereby a pair of values designating the start frame and end frame is stored as designation data of the video clip. Edit video process 510 will be explained more fully with respect to FIG. 6.

At stage 520, the author assigns one or more phrases, preferably comprising questions or statements in text form, to a content sequence. When a user utters the phrase, the content sequence may be invoked. Phrases may be questions, such as "Where do you live?," or may be statements, such as "Tell me more about space flight." As a phrase is assigned to a content sequence, the phrase may be stored in the conversation database as being linked to the content sequence. At this stage, the author may also designate a multimedia object to associate with a phrase in addition to the content sequence. In this manner, the system may enter multimedia mode to display a multimedia object under discussion by the subject.

At stage 530, the author may execute a phoneme generation process which takes one or more phrases associated with a content clip and generates a list of phonemes associated with the phrases. This may enhance the speed of the matching process, so that the execution of the interactive communication script with the user proceeds promptly and with little delay. As is known to those of ordinary skill in the art, phonemes are units of specific sound in a word or phrase. For example, "Bull" in "Bullet," "Kashun" in "Communication," and "Cy" and "Run" in "Siren."

Phonemes may be generated based on portions of the phrase, a key word and synonyms of the key word in the phrase, or a qualifier and synonyms of the qualifier in the phrase. The phoneme generation process is explained more fully in FIG. 7. The end product of the author tasks is a data file known as an interactive communication script, which may be stored in the conversation database. User tasks 535 are those tasks associated with the execution of the interactive communication script in system 100 (FIG. 1).

At stage 540, the user provides input to the interactive system 100 by speaking into microphone 140 (FIG. 1). At stage 550, the interactive system 1100 processes the input speech to generate one or more perceived sound matches ("PSMs"). At stage 570, the PSMs are compared to the phoneme phrases in the conversation database to generate a list of possibly matching phrases. At stage 570, the best matching phrase is determined and a corresponding content sequence is displayed to the user via display 120 and speakers 130. Thus, a conversation may be simulated. User tasks process 535 is explained in more detail with respect to FIG. 12.

Figure 6:
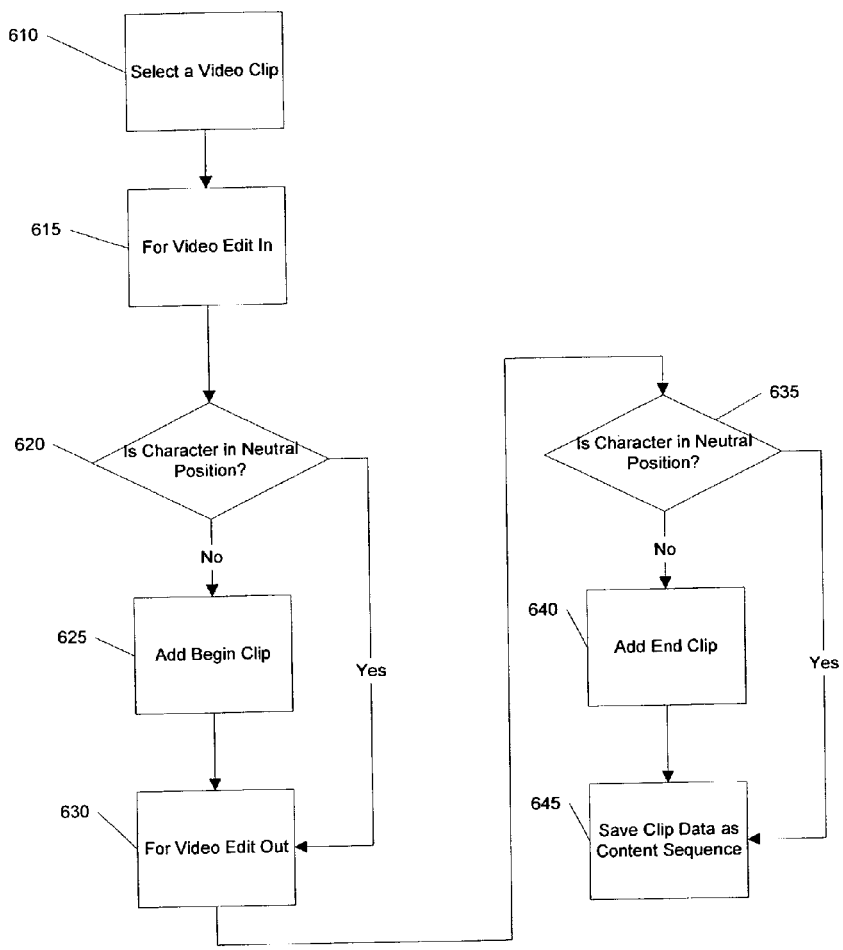
FIG. 6 is a flowchart of a video editing process consistent with the present invention.

FIG. 6 is a flowchart of a video editing process 510 (FIG. 5) consistent with the present invention. At stage 610, an author selects a video clip from a plurality of stored multimedia files. The stored multimedia files may be, for example, raw video clips generated by the taping of a subject during an interview process. Raw video clips may be captured to magnetic or optical storage media in, for example, Digital Video (DV) format from source footage of master tapes from an original subject interview. These raw video clips may be compressed at a ratio using software or hardware digital video codecs such as MPEG3 or MPEG4 standard. The content clips stored in the database may be indexed by subject and stored in the compressed state.

The stored multimedia files may also include "B-roll" video such as a video clip of Friendship 7 featuring John Glenn, where such "B-roll" video may be obtained from existing archives. Those skilled in the art will appreciate that other sources are available for use as stored multimedia files.

This selection may be by selecting a start frame and an end frame for the content clip. At stage 615, the process begins for video edit in, i.e., for the start frame designation. At stage 620, the process checks to see if the subject is not in a neutral position in the start frame, for example, if the subject's mouth is open or if the subject's face is close to the edge of the visual frame. If the subject is not in a neutral position in the start frame, the process, at stage 625, selects a begin clip for frame matching.

The begin clip consists of a short transitional video sequence of the subject moving from a neutral position to the position of the subject in the start frame of the content, or a position close thereto. The process may select from multiple begin clips to select the one with the best fit for the selected content clip. Begin clips may be run in forward or reverse, with or without sound, whichever is better for maintaining a smooth transition to the start frame of the content clip. The begin clip may be physically or logically added to the start of the content clip to form a content sequence. For example, the content sequence may be saved in a file comprising the begin clip and video clip. Or, the begin clip may be designated by a begin clip start frame and a begin clip end frame which may be stored along with the information specifying the content clip start frame and the content clip end frame. Thus, the content sequence data record may comprise the following fields: begin clip file name, begin clip start frame, begin clip stop frame, content clip file name, content clip start frame, and content clip end frame.

At stage 630, the process begins for video edit out, i.e., for the stop frame designation. At stage 635, the process checks to see if the subject is at a neutral position in the stop frame. If the subject is not in a neutral position in the stop frame, the process, at stage 640, selects an end clip for frame matching. The end clip serves as a transitional clip to a neutral position from the position of the subject in the stop frame, or a position close thereto. The process may select from multiple end clips to select the one with the best fit. End clips may be run in forward or reverse, with or without sound, whichever is better for maintaining a smooth transition to the start frame. The end clip may be physically or logically added to the start of the content clip. For example, the content sequence may be saved in a file comprising the end clip and content clip. Alternatively, the end clip may be designated by an end clip start frame and an end clip end frame which may be stored along with the information regarding the content clip start frame and the content clip end frame. Thus, the content sequence data record may comprise the following fields: content clip file name, content clip start frame, content clip end frame, end clip file name, end clip start frame, and end clip stop frame.

Where both begin clips and end clips are utilized, the content sequence data record may comprise the following fields: begin clip file name, begin clip start frame, begin clip stop frame, content clip file name, content clip start frame, content clip end frame, end clip file name, end clip start frame, and end clip stop frame.

Figure 7:
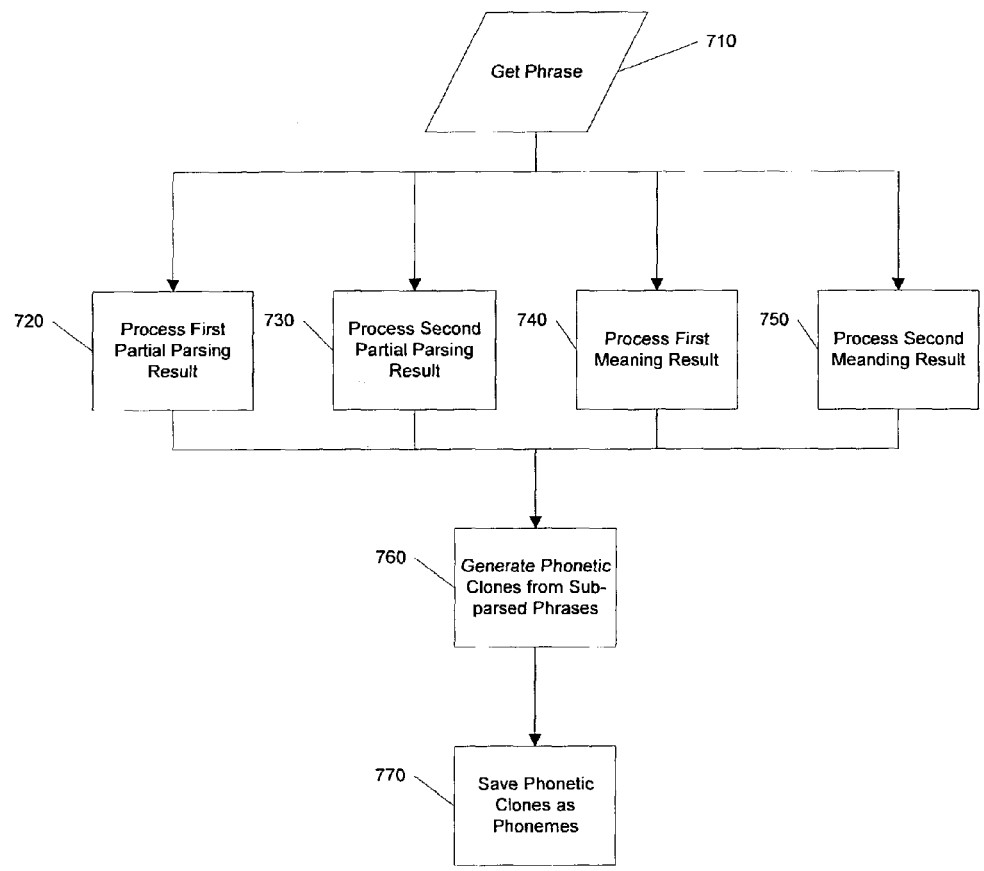
FIG. 7 is a flowchart of a phoneme generating process consistent with the present invention.

FIG. 7 is a flowchart of a phoneme generating process 530 (FIG. 5) consistent with the present invention. This process may be used by the author to generate a table of phonemes associated with a phrase associated with a content clip. At stage 710, the process retrieves the phrase to be processed in the form of a text file. Next, the process may implement one or more stages of phrase processing to generate groups of sub-parsed phrases.

Various types of phrase processing may be implemented. In the present embodiment, four phrase processing stages are executed. Specifically, two syntax-based stages, partial parsing stages 720 and 730, are executed and two meaning-based stages, association stages 740 and 750, are executed. Each of these stages yields sub-parsed phrases of the associated phrase.

At stage 760, phonetic clones may be generated of the sub-parsed phrases returned from stages 720-750. Phonetic clones are the phonetic spellings of the sub-parsed phrases or terms. To generate phonetic clones, the author may consider each phrase and anticipate the various ways that a user could paraphrase the phrase. The author then may anticipate the various ways that a user might pronounce the question. The author may then develop phonemes as needed for optimal recognition. Phonemes are applied to account for the differences between written and spoken language. For example, "your wife" when spoken will often sound like "urwife," as if it were a single word. The articulation of both words in "your wife" would be unusual in natural conversation. Unless a phoneme is used to alert the system of such natural speech habits, recognition may be made more difficult, though not impossible, and the continuity of the virtual dialog may be disrupted.

To illustrate some further example of the process, sub-parsed phrase "in school" may yield the phonetic clones "enskool" and "inskul," "when you married" may yield "winyoomarried" and wenyamarried," and "to college" may yield "tuhcallidge" and toocawlige." At stage 770, the phonetic clones are saved in a phoneme data file as a phoneme text file associated with the content sequence associated with the phrase.

Figure 8:
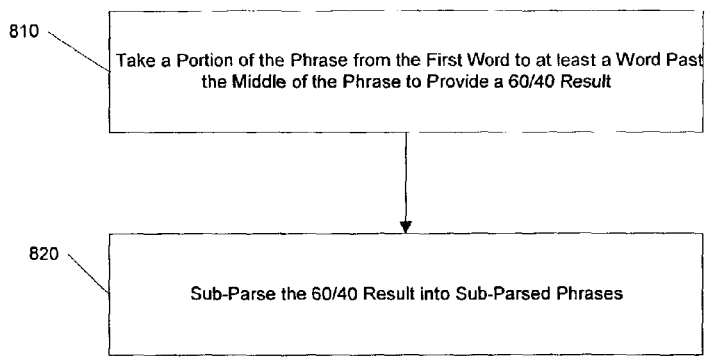
FIG. 8 is a flowchart of a first partial parsing process consistent with the present invention.

FIG. 8 is a flowchart of first partial processing stage 720 consistent with the present invention. Stage 720 is a partial processing stage, specifically, a "60/40" parsing stage, that is 60%/40%. At stage 810, a majority of the associated phrase, beginning with the first word of the phrase is parsed from the phrase. For example, the phrase "Were you in school when you married" may be 60/40 parsed as "Were you in school when." At stage 820, the 60/40 result is sub-parsed into one or more sub-phrases. For example, sub-parsing the 60/40 parsed phrase "Were you in school when" may yield sub-parsed phrases "were you in school," "in school," and "in school when," each consisting of more than half of the parsed phrase "Were you in school when" and each beginning with a different word counted from the beginning of the parsed phrase.

Figure 9:
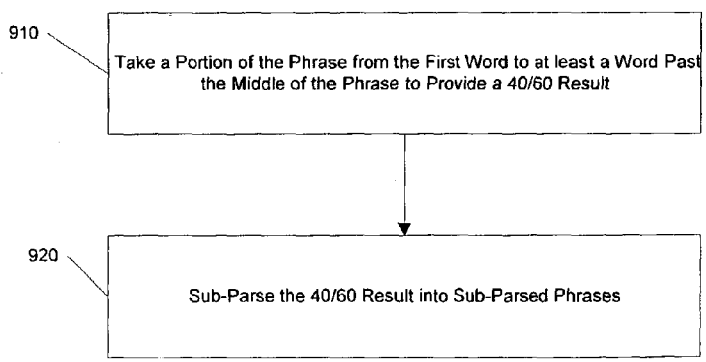
FIG. 9 is a flowchart of a second partial parsing process consistent with the present invention.

FIG. 9 is a flowchart of second partial processing stage 730 consistent with the present invention. Stage 730 is a partial parsing stage similar to stage 720 (FIG. 8), except that parsing begins from the end of the associated phrase, rather than the beginning as in stage 720. Stage 730 is referred to as a "40/60" stage. Thus, at stage 910, a majority of the associated phrase, ending with the last word of the phrase is parsed from the phrase. For example, the phrase "Were you in school when you married" may be 40/60 parsed as "school when you married." At stage 920, the 40/60 result is sub-parsed into one or more phrases. For example, sub-parsing the 40/60 phrase "school when you married" may yield the sub-parsed phrases "you married," "when you married," and "school when."

Figure 10:
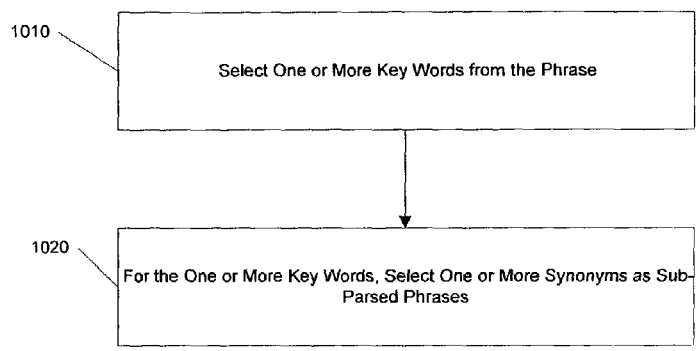
FIG. 10 is a flowchart of a first meaning-based process consistent with the present invention.

FIG. 10 is a flowchart of first meaning-based process, association process 740, consistent with the present invention. Specifically, 740 is a type of meaning-based process known as a "keyword" process. Keywords may be nouns or noun phrases that depict a central topic or idea of a question or statement. For example, for the phrase "Were you in school when you married" a keyword might be "school." At stage 1010, one or more keywords are selected from the associated phrase, based on meanings of words in the associated phrase. At stage 1020, terms with similar meaning may be generated for the keyword. For example, the keyword "school" may yield, "to college," "studying," and "student."

Figure 11:
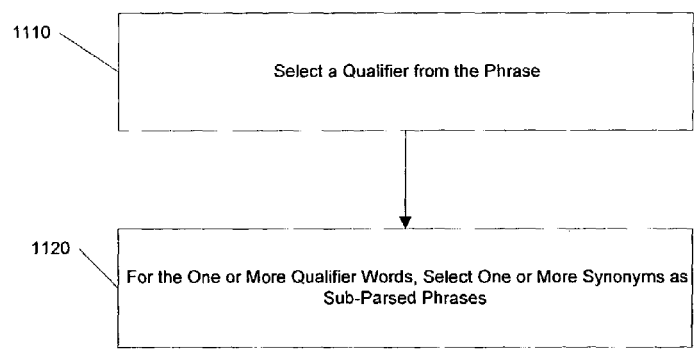
FIG. 11 is a flowchart of a second meaning-based process consistent with the present invention.

FIG. 11 is a flowchart of second meaning-based process 750 consistent with the present invention, based on "qualifiers." Qualifiers may be adjectives or adjective phrases that modify the intention or meaning of a question or statement. For example, in the question "How often do you smoke?" the keyword is "smoke" and the qualifier is "how often."

At stage 1110, one or more qualifiers are selected from the phrase. For example, for the phrase "Were you in school when you married" a qualifier might be "married." At stage 1020, synonyms may be generated for the qualifier. For example, the qualifier "married" may yield, for example, the synonyms "your wife," "your wedding," "get married."

Figure 12:
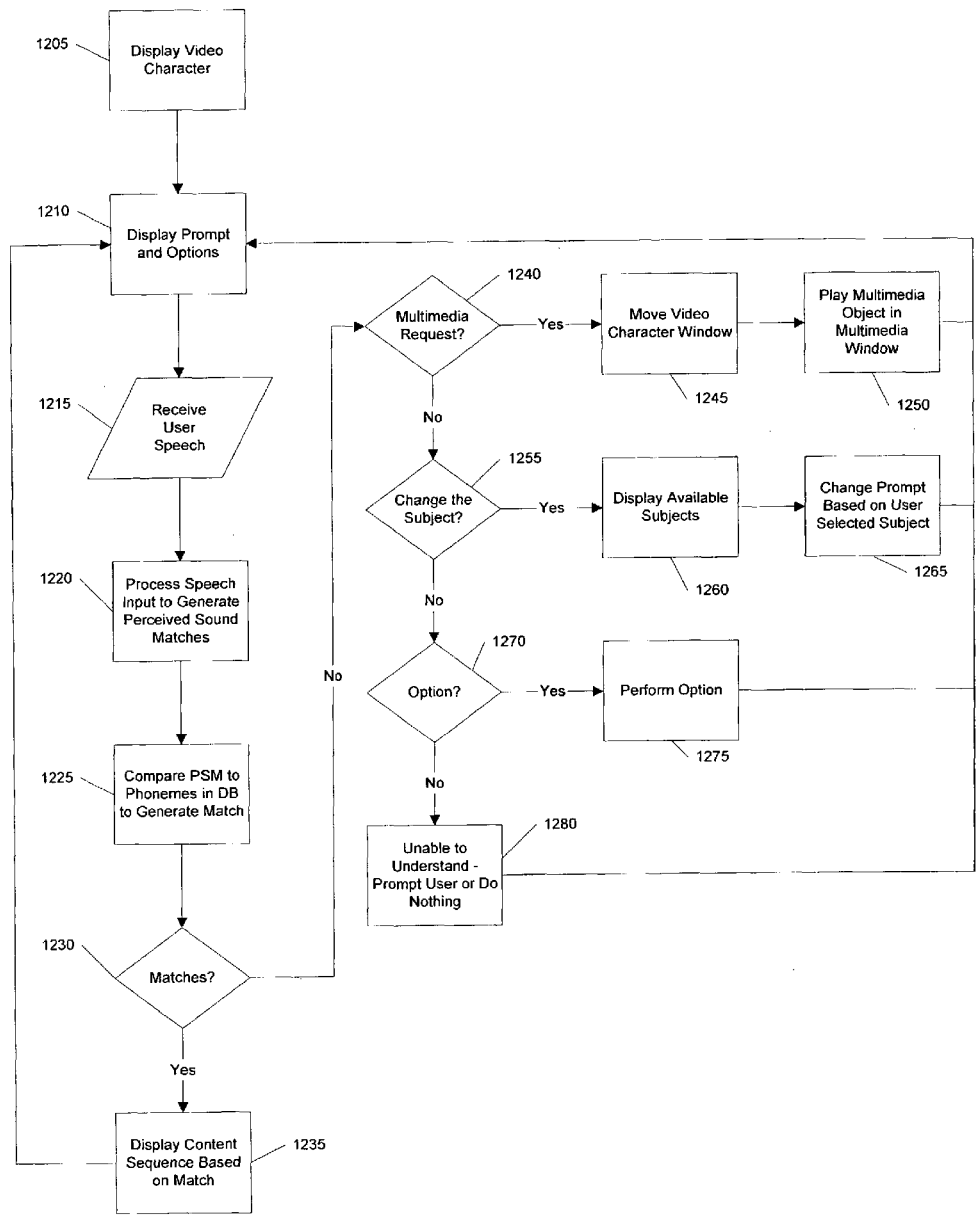
FIG. 12 is a more detailed flowchart of a user interaction process consistent with the present invention.

FIG. 12 is a more detailed flowchart of a user interaction process consistent with the present invention. At stage 1205, the subject may be displayed in a neutral position on the display awaiting a question or statement from the user. The subject may be displayed as a still picture, or the subject may be displayed through a content clip of the subject in a "listening" state. At stage 1210, one or more prompts may be displayed, and one or more options may be displayed. Options may include, for example: "Begin the interview"; "Repeat that please"; "Change the subject"; and "Session review" to review the questions thus far asked; "Change scroll speed" to adjust the speed of the prompts.

At stage 1215, an utterance from a user is received. At stage 1220, the utterance is processed to generate a list of perceived sound matches ("PSM") in the form of text. At stage 1225, the PSM are compared to the library of stored phonemes, also in text form, to generate a list of matches. The phonemes in the library that match the utterance are selected and prioritized according to the closeness of the sound match on the basis of scores. A predetermined number of these prioritized phonemes may be passed to the system for scoring to determine whether a valid recognition has occurred. The score of each phoneme may be arrived at by multiplying the number of discernable letters in the PSM by a priority number set by the author. The sum of all of the products from the matches to the utterances may be utilized to determine if a recognition, or match, has occurred. (stage 1230). A match occurs if the sum is equal to or greater than a threshold level set by the author.

If a match occurs, at stage 1235, the linked content clip is displayed to the user. If a match is not made, at stage 1240, a check is made to see if the utterance was a multimedia request. If so, at stage 1245, the subject window may be moved, and, at stage 1250, the multimedia window may display the multimedia object for the user. Following stage 1250, the system returns to the prompting state at stage 1210.

If the utterance was not a multimedia request, at stage 1255 a check is made to see if the utterance was a request to change the subject. If so, at stage 1260, a listing of available subjects is displayed. At stage 1265, the prompts are updated to reflect a user input subject selection. Following stage 1265, the system returns to the prompting state at stage 1210.

At stage 1270, a check is made to see if the utterance was a request for another option. If so, at stage 1275, the option is executed. For example, the utterance may be a request to repeat the last answer. If so, the last answer given by the subject is repeated by replaying the video clip. Following stage 1275, the system returns to the prompting state at stage 1210.

If none of these situations matches, at stage 1280, the system determines that it cannot process the utterance. At this stage, the system may return to stage 1210 or the system may play a content sequence whereby the subject states that he cannot understand the question. For example, the subject may state "I'm sorry. I didn't understand your question," or "I'm having trouble hearing you, will you please repeat your question?"

At any point in time in the above described process, the user may halt the process by issuing an utterance, such as "Stop." This utterance is processed by the system and recognized as a command to halt the process. Halting the process may return the process to stage 1210. While halting the subject, the process may attempt to not compromise the believability of the situation by returning the subject to the neutral position. The process may also utilize aspects of the end clip associated with the playing video clip to maintain believability. For example, the process may take one or more frames from the end of the content clip and one or more frames from the end of the end clip and utilize these frames to transition the subject to the neutral position.

Those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented, using applets written in the Java programming language, or may be implemented as with discrete electrical components or as at least one hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method of simulating interactive communication between a user and a human subject, comprising:

assigning at least one phrase to a stored content sequence, wherein the content sequence comprises a content clip of the subject, the subject being a human recorded on video, the content clip including a contemporaneously-recorded head and mouth of the subject and contemporaneously-recorded audio of the subject, wherein the content clip is free of any superimposed facial features;

parsing the at least one phrase to produce at least one phonetic clone;

associating the at least one phonetic clone with the stored content sequence;

creating a transition between the content clip and the second content sequence by frame-matching a frame of the stored content sequence, the content sequence including the human subject speaking, with a frame of a second content sequence, the frame-matching being performed with respect to the recorded video of the entire head and facial features of the human subject;

receiving an utterance from the user;

matching the utterance to the at least one phonetic clone; and in response to matching the utterance, displaying the stored content sequence associated with the at least one phonetic clone in succession with the second content sequence.

2. The method of claim 1, wherein parsing the phrase to produce the at least one phonetic clone further comprises:

performing a first partial parsing of the phrase to produce at least one first partially parsed phrase;

sub-parsing the at least one first partially parsed phrase to produce at least one first sub-parsed phrase; and generating at least one phonetic clone from the at least one first sub-parsed phrase.

3. The method of claim 1, wherein parsing the phrase to produce the at least one phonetic clone further comprises:

performing a second partial parsing of the phrase to produce at least one second partially parsed phrase;

sub-parsing the at least one second partially parsed phrase to produce at least one second sub-parsed phrase; and generating at least one phonetic clone from the at least one second partially parsed phrase.

4. The method of claim 1, wherein parsing the phrase to produce the at least one phonetic clone further comprises:

selecting a keyword from the phrase;

selecting at least one synonym of the keyword; and generating at least one phonetic clone of the at least one synonym of the keyword.

5. The method of claim 1, wherein parsing the phrase to produce the at least one phonetic clone further comprises:

selecting a qualifier from the phrase;

selecting at least one synonym of the qualifier; and generating at least one phonetic clone of the at least one synonym of the qualifier.

6. The method of claim 1, wherein matching the utterance to the at least one phonetic clone further comprises:

processing the utterance to generate a perceived sound match;

comparing the perceived sound match to the at least one phonetic clone;

performing an arithmetic operation on the at least one phonetic clone and the perceived sound match to generate a result;

comparing the result to a threshold amount; and if the result is greater than the threshold amount, determining that a match has been found.

7. The method of claim 6, wherein performing the arithmetic operation further comprises:

counting the number of letters matched between the perceived sound match and the at least one phonetic clone; and multiplying the number of letters matched by a priority number to produce a product as the result.

8. The method of claim 1, further comprising:

storing a video clip as a content clip; and following display of the content sequence, displaying a neutral image of the subject.

9. The method of claim 8, further comprising:

selecting a begin clip based on frame-matching the last frame of the begin clip with the first frame of the content clip and the first frame of the begin clip with the neutral image of the subject; and storing the begin clip sequentially prior to the stored content clip within the stored content sequence.

10. The method of claim 8, further comprising:
selecting an end clip based on frame-matching the first frame of the end clip with the last frame of the content clip and the last frame of the end clip with the neutral image of the subject; and
storing the end clip sequentially after the stored content clip within the stored content sequence.

11. The method of claim 1, further comprising:
displaying a neutral image of the subject when not displaying the content sequence.

12. The method of claim 1, further comprising:
storing a listening clip of the subject; and
displaying the listening clip of the subject when not displaying the content sequence.

13. The method of claim 1, further comprising:
storing a multimedia object; and
displaying the multimedia object to the user upon request of the user.

14. The method of claim 13, wherein displaying the multimedia object to the user is performed upon matching the utterance of the user to a request to display the multimedia object.

15. The method of claim 13, wherein displaying the multimedia object to the user is performed based on the stored multimedia object being associated with the matched phonetic clone.

16. The method of claim 1, further comprising:
receiving a halt command from the user; and
displaying a neutral image of the subject following the halt command.

17. The method of claim 10, comprising:
receiving a halt command from the user;
transitioning from the content clip to a neutral image of the subject; and
displaying the neutral image of the subject following the halt command.

18. The method of claim 1, comprising a second human subject and further comprising:
assigning at least one second phrase to a stored video clip of the second subject;
parsing the at least one second phrase to produce at least one phonetic clone of the at least one second phrase;
associating the at least one phonetic clone of the at least one second phrase with the stored video clip of the second subject;
receiving an utterance from the user;
matching the utterance to the at least one phonetic clone of the second subject;
comparing the match of the at least one phonetic clone of the second subject with the match of the at least one phonetic clone of the subject; and
if the match of the at least one phonetic clone of the second subject is superior to the match of the at least one phonetic clone of the subject, displaying the stored video clip of the second subject associated with the at least one phonetic clone and not displaying the stored video clip of the subject.

19. The method of claim 18, further comprising displaying the stored content sequence of the subject following the displaying of the stored content sequence of the second subject.

20. A system for simulating interactive communication between a user and a human subject, the system comprising:
a display for displaying the subject, the subject being a human recorded on video;
a memory; and
a processor, coupled to the memory and the display, the processor operable to:
assign at least one phrase to a stored content sequence of the subject,
wherein the content sequence comprises a content clip of the subject, the content sequence including contemporaneously-recorded audio of the human that is played simultaneously with the video of the human, wherein the video of the human includes a contemporaneously-recorded head and mouth of the human, wherein the content clip is free of any superimposed facial features;
parse the at least one phrase to produce at least one phonetic clone of the at least one phrase;
associate the at least one phonetic clone with the stored content sequence;
create a transition between the content clip and the second content sequence by frame-matching a frame of the stored content sequence, the content sequence including the human subject speaking, with a frame of a second content sequence, the frame-matching being performed with respect to the recorded video of the entire head and facial features of the human subject;
receive an utterance from the user;
match the utterance to the at least one phonetic clone; and
in response to the match, display the stored content sequence associated with the at least one phonetic clone in succession with the second content sequence.

21. A computer-implemented method of simulating interactive communication between a user and a human subject, comprising:
receiving a voice input from the user;
matching the voice input to one of a plurality of a stored phonetic clones, the phonetic clones each corresponding to a target speech phrase associated with a stored content sequence file depicting the subject, the number of stored phonetic clones being greater than the number of stored content sequence files, the subject being a human recorded on video, the content sequence including contemporaneously-recorded audio of the human that is played simultaneously with the video of the human, wherein the video of the human includes a contemporaneously-recorded head and mouth of the human, wherein the content clip is free of any superimposed facial features;
creating a transition between the content clip and the second content sequence by frame-matching a frame of the stored content sequence, the content sequence including the human subject speaking, with a frame of a second content sequence, the frame-matching being performed with respect to the recorded video of the entire head and facial features of the human subject; and
in response to the matching, displaying the stored content sequence file matched to the phonetic clone and the second content sequence in succession.

22. The method of claim 21, wherein matching the voice input to the phonetic clone further comprises:
processing the voice input to generate a perceived sound match;
comparing the perceived sound match to the phonetic clone;
performing an arithmetic operation on the phonetic clone and the perceived sound match to generate a result;
comparing the result to a threshold amount; and
if the result is greater than the threshold amount, determining that a match has been found.

23. The method of claim 21, wherein the target speech phrase is associated with a stored multimedia object and further comprising:
  displaying the stored multimedia object matched to the phonetic clone.

24. The method of claim 21, further comprising:
  displaying a stored neutral image of the subject following the display of the stored content sequence file of the subject.

25. The method of claim 21, further comprising:
  displaying a stored neutral image of the subject prior to the display of the stored content sequence file of the subject.

26. The method of claim 21, further comprising:
  displaying a stored listening clip of the subject following the display of the stored content sequence file of the subject.

27. The method of claim 21, further comprising:
  displaying a stored listening clip of the subject prior to the display of the stored content sequence file of the subject.

28. The method of claim 21, further comprising:
  receiving a second voice input from the user during the display of the stored content sequence file;
  matching the second voice input from the user to a stored phonetic clone of a halt utterance; and
  terminating the display of the stored content sequence file.

29. The method of claim 28, further comprising:
  following termination of the display of the stored content sequence file, displaying a stored neutral image of the subject.

30. The method of claim 28, further comprising:
  following termination of the display of the stored content sequence file, transitioning to a stored neutral image of the subject.

31. A conversation system for simulating interactive communication between a user and a first human subject and a second human subject, comprising:
  a display for displaying the first and second subjects, the first and second subjects being humans recorded on video;
  a memory; and
  a processor, coupled to the memory and the display, the processor operable to:
    receive a voice input from the user;
    match the voice input to one of a plurality of a stored phonetic clones, a first portion of the phonetic clones each corresponding to a target speech phrase associated with a stored content sequence file depicting the first subject and a second portion of the phonetic clones each corresponding to a target speech phrase associated with a stored content sequence file depicting the second subject, the number of stored phonetic clones being greater than the number of stored content sequence files, the content sequence including a contemporaneously-recorded head and mouth of the second subject and contemporaneously-recorded audio of the second subject, wherein the content clip is free of any superimposed facial features;
    in response to the match, display the stored content sequence file matched to the phonetic clone in succession with a second content sequence; and
    frame-match a frame of the stored content sequence with a frame of the second content sequence, the stored content sequence including a human subject speaking, the frame-matching being performed with respect to the recorded video of the entire head and facial features of the second human subject to create a transition for the stored content clip.

32. The system of claim 31, wherein the processor is further operable to:
  score the quality of the match between the voice input from the user and a stored phonetic clone corresponding to a target speech phrase associated with a stored content sequence file depicting the first subject, producing a first subject score;
  score the quality of the match between the voice input from the user and a stored phonetic clone corresponding to a target speech phrase associated with a stored content sequence file depicting the second subject, producing a second subject score; and
  if the first subject score is greater than the second subject score, display the stored content sequence associated with the first subject.

33. The system of claim 31, wherein the processor is further operable to, following the display of the stored content sequence associated with the first subject, display the stored content sequence associated with the second subject.

* * * * *